United States Patent
Scanlon

(10) Patent No.: US 10,787,115 B1
(45) Date of Patent: Sep. 29, 2020

(54) ANGLE-ADJUSTING VEHICULAR HEADLIGHTS

(71) Applicant: Eugene Scanlon, Ridgeland, SC (US)

(72) Inventor: Eugene Scanlon, Ridgeland, SC (US)

( * ) Notice: Subject to any disclaimer, the term of this patent is extended or adjusted under 35 U.S.C. 154(b) by 0 days.

(21) Appl. No.: 16/747,596

(22) Filed: Jan. 21, 2020

(51) Int. Cl.
| | |
|---|---|
| *F21V 1/00* | (2006.01) |
| *B60Q 1/11* | (2006.01) |
| *B60Q 1/04* | (2006.01) |
| *F21S 41/657* | (2018.01) |
| *G01S 17/88* | (2006.01) |
| *G01C 5/00* | (2006.01) |

(52) U.S. Cl.
CPC .............. *B60Q 1/11* (2013.01); *B60Q 1/0483* (2013.01); *F21S 41/657* (2018.01); *G01C 5/00* (2013.01); *G01S 17/88* (2013.01); *B60Q 2300/13* (2013.01); *B60Q 2300/14* (2013.01)

(58) Field of Classification Search
None
See application file for complete search history.

(56) References Cited

U.S. PATENT DOCUMENTS

| | | | |
|---|---|---|---|
| 3,808,417 A | 4/1974 | Martin | |
| 4,110,819 A | 8/1978 | Ishikawa | |
| 5,122,935 A | 6/1992 | Peterson | |
| 5,163,319 A | * 11/1992 | Spies | .................... B60G 17/019 356/601 |
| 5,971,574 A | 10/1999 | Taniuchi | |
| 6,767,118 B2 | 7/2004 | Seif | |
| 10,081,293 B2 | 9/2018 | Valencia | |
| D837,421 S | 1/2019 | Yamashita | |
| 2006/0023461 A1 | 2/2006 | Knight | |
| 2017/0327030 A1 | * 11/2017 | Kim | ......................... B60Q 1/24 |

FOREIGN PATENT DOCUMENTS

WO       2008046523       4/2008

* cited by examiner

*Primary Examiner* — Vip Patel
(74) *Attorney, Agent, or Firm* — Kyle A. Fletcher, Esq.

(57) ABSTRACT

The angle-adjusting vehicular headlights comprise a housing, a swivel bracket, a distance checker, a tilt mechanism, a controller, and a headlight socket. The angle-adjusting vehicular headlights may change an elevation angle of a headlight responsive to a determination by the controller that an inclination angle of a vehicle has changed. As non-limiting examples, the inclination angle may have changed due to a cargo load that has been placed into the vehicle thus compressing the vehicle suspension or the inclination angle may have changed due to the cargo load being removed from the vehicle and the resulting decompression of the vehicle suspension. angle-adjusting vehicular headlights may generally be deployed in pairs.

20 Claims, 6 Drawing Sheets

ANGLE-ADJUSTING VEHICULAR HEADLIGHTS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicular lighting, more specifically, angle-adjusting vehicular headlights.

SUMMARY OF INVENTION

The angle-adjusting vehicular headlights comprise a housing, a swivel bracket, a distance checker, a tilt mechanism, a controller, and a headlight socket. The angle-adjusting vehicular headlights may change an elevation angle of a headlight responsive to a determination by the controller that an inclination angle of a vehicle has changed. As non-limiting examples, the inclination angle may have changed due to a cargo load that has been placed into the vehicle thus compressing the vehicle suspension or the inclination angle may have changed due to the cargo load being removed from the vehicle and the resulting decompression of the vehicle suspension. angle-adjusting vehicular headlights may generally be deployed in pairs.

An object of the invention is to adjust an elevation angle of a headlight responsive to a change in the loading of the vehicle.

Another object of the invention is to determine that the loading of the vehicle has changed by measuring a change in the height of the headlight.

A further object of the invention is to determine the height of the headlight when the vehicle's transmission is in PARK.

Yet another object of the invention is to lock the elevation angle of the headlight when the vehicle's transmission is in any gear other than PARK.

These together with additional objects, features and advantages of the angle-adjusting vehicular headlights will be readily apparent to those of ordinary skill in the art upon reading the following detailed description of the presently preferred, but nonetheless illustrative, embodiments when taken in conjunction with the accompanying drawings.

In this respect, before explaining the current embodiments of the angle-adjusting vehicular headlights in detail, it is to be understood that the angle-adjusting vehicular headlights is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the angle-adjusting vehicular headlights.

It is therefore important that the claims be regarded as including such equivalent construction insofar as they do not depart from the spirit and scope of the angle-adjusting vehicular headlights. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
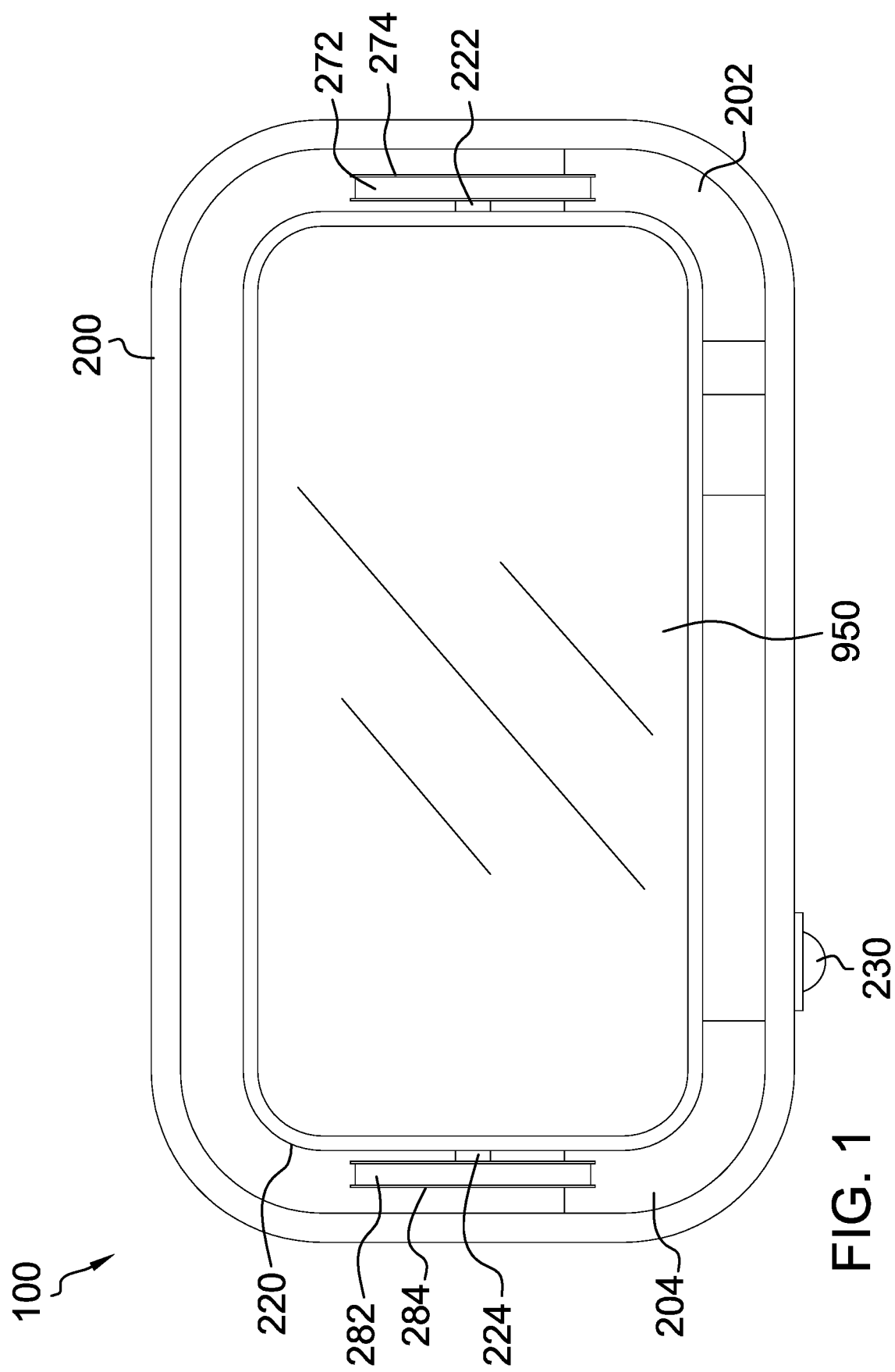
FIG. 1 is a front view of an embodiment of the disclosure.
Figure 2:
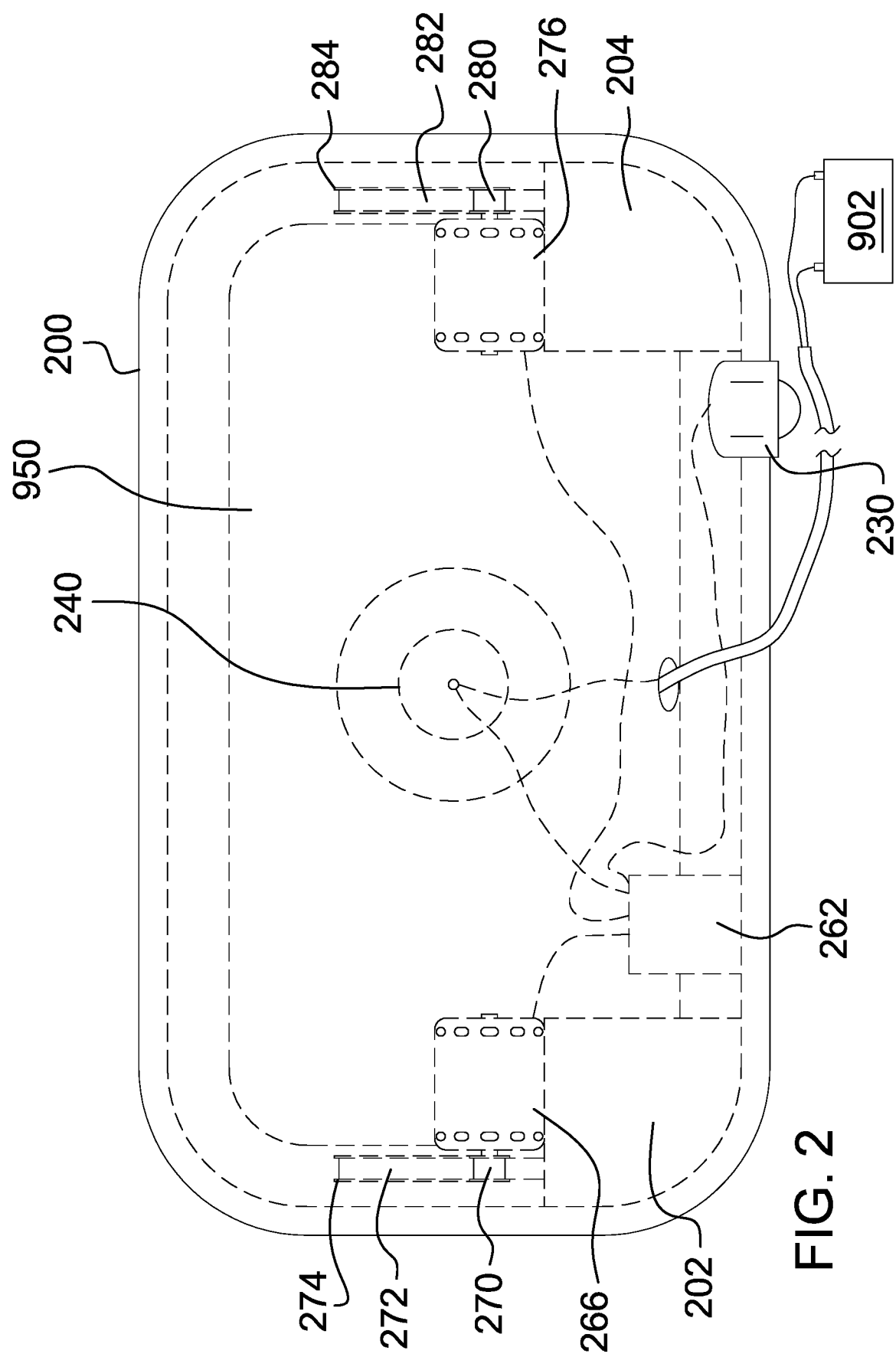
FIG. 2 is a rear view of an embodiment of the disclosure.
Figure 3:
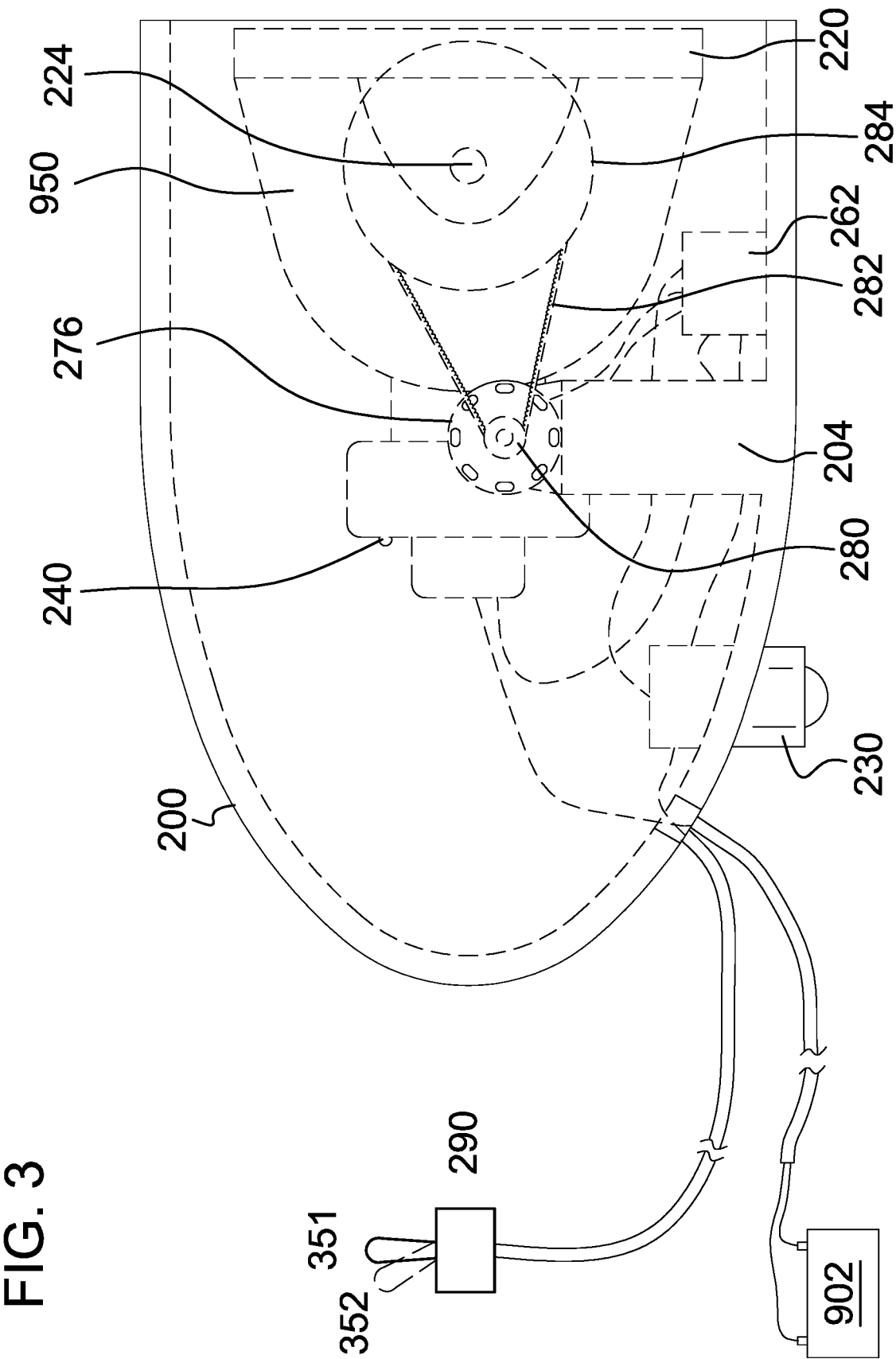
FIG. 3 is a side view of an embodiment of the disclosure.
Figure 4:
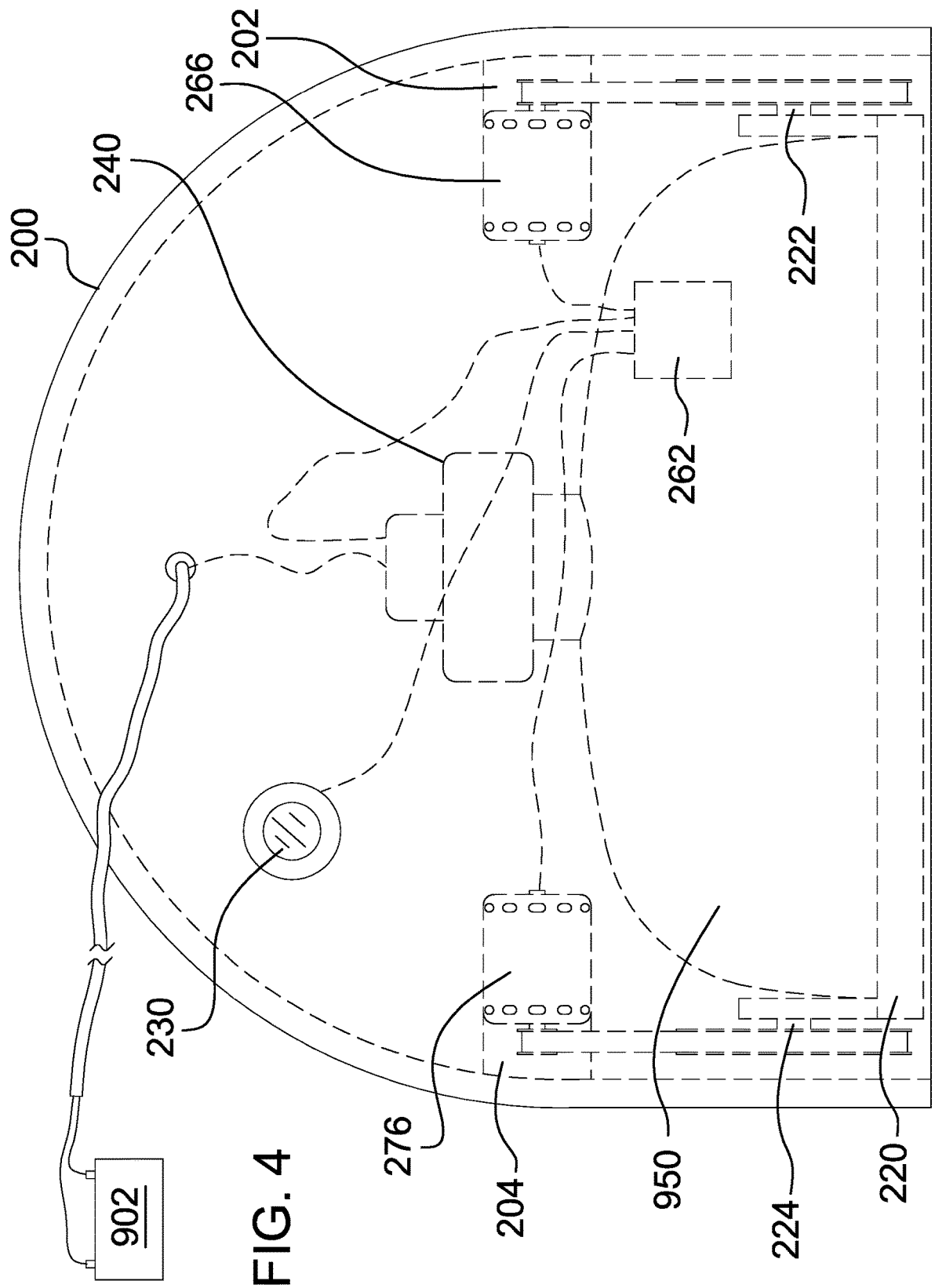
FIG. 4 is a bottom view of an embodiment of the disclosure.
Figure 5:
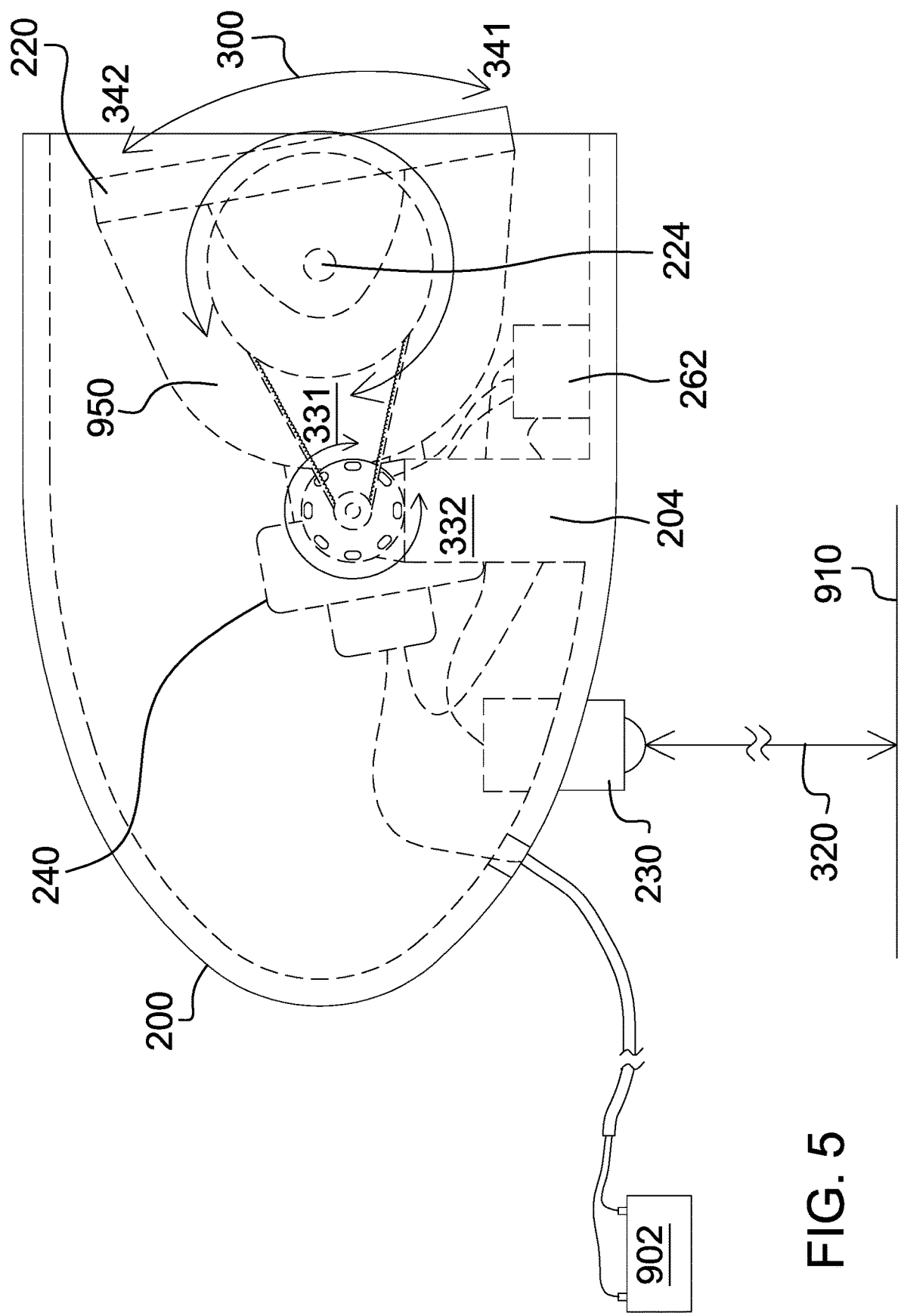
FIG. 5 is an in-use view of an embodiment of the disclosure illustrating the swivel bracket pivoted upwards.
Figure 6:
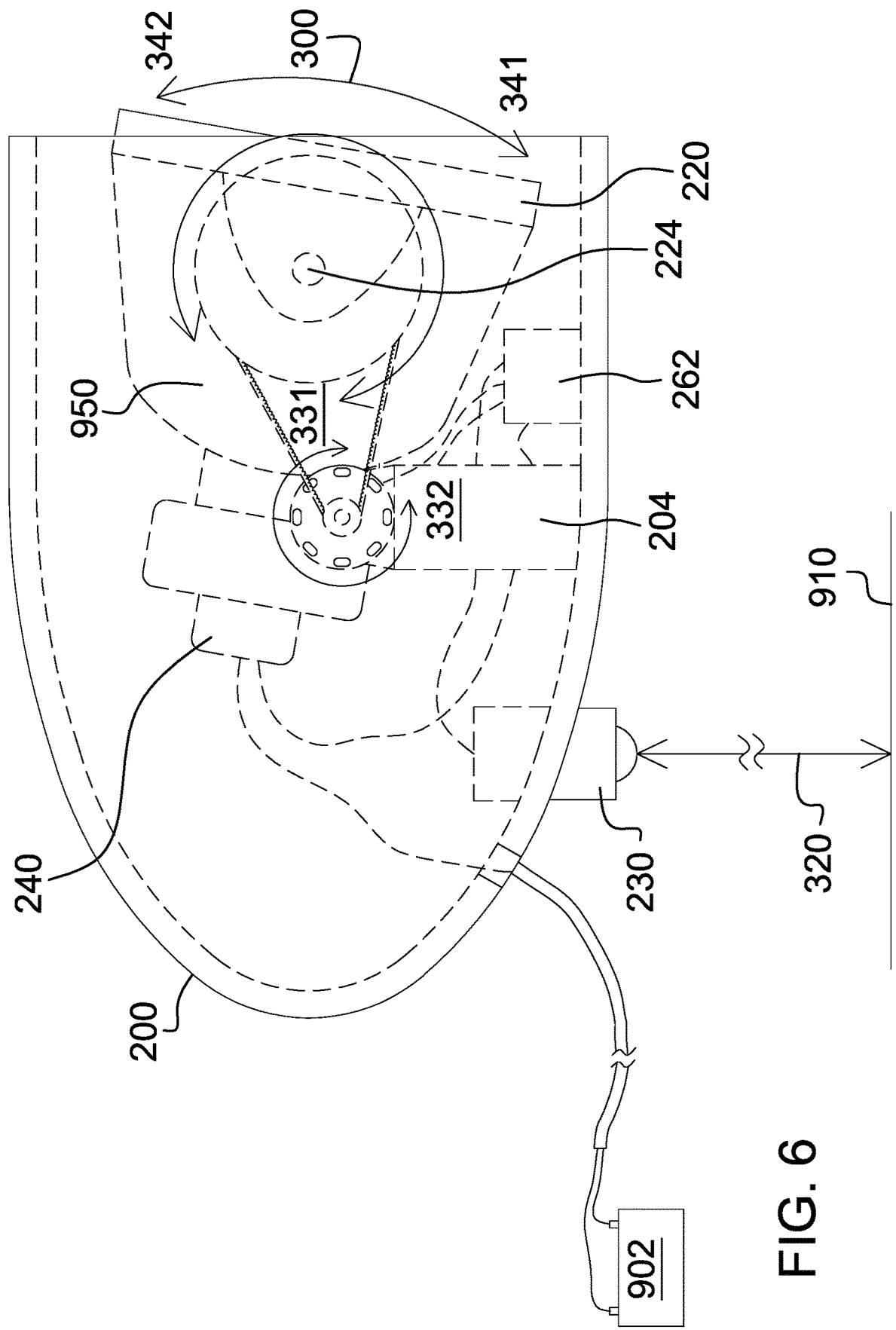
FIG. 6 is an in-use view of an embodiment of the disclosure illustrating the swivel bracket pivoted downwards.

Detailed reference will now be made to a first potential embodiment of the disclosure, which is illustrated in FIGS. 1 through 6.

The angle-adjusting vehicular headlights 100 (hereinafter invention) comprises a housing 200, a swivel bracket 220, a distance checker 230, a tilt mechanism, a controller 262, and a headlight socket 240. The invention 100 may change an elevation angle 300 of a headlight 950 responsive to a determination by the controller 262 that an inclination angle of a vehicle has changed. As non-limiting examples, the inclination angle may have changed due to a cargo load that has been placed into the vehicle thus compressing the vehicle suspension or the inclination angle may have changed due to the cargo load being removed from the vehicle and the resulting decompression of the vehicle suspension.

The housing 200 may be an outermost enclosure for the headlight 950. The housing 200 may couple to the vehicle.

The orientation of the housing 200 may remain fixed relative to the vehicle as the cargo load within the vehicle changes. This may indicate that the elevation angle 300 of the headlight 950 mounted within the housing 200 would change as the inclination angle of the vehicle changes if the invention 100 was not present or not working. The housing 200 may comprise a right motor mount 204 and a left motor mount 202. The right motor mount 204 and the left motor mount 202 may be projections within the housing 200 located on alternate lateral sides of the housing 200. A right motor 276 may couple to the right motor mount 204 and a left motor 266 may couple to the left motor mount 202.

The swivel bracket 220 may be a pivoting bracket located within the housing 200. The swivel bracket 220 may be pivotably coupled to the housing 200 via a right pivot 224 and a left pivot 222. The headlight 950 may removably couple to the front of the swivel bracket 220 such that the elevation angle 300 of the headlight 950 is determined by the swivel bracket 220. The swivel bracket 220 may pivot to change the elevation angle 300 of the headlight 950 relative to the housing 200.

The distance checker 230 may determine a height 320 of the housing 200 above ground 910. The distance checker 230 may be coupled to the housing 200 and may be accessible on the underside of the housing 200 where the distance checker 230 has an unobstructed line-of-sight to the ground 910. The distance checker 230 may communicate the height 320 of the housing 200 above the ground 910 to the controller 262. The height 320 of the housing 200 above the ground 910 may decrease when the cargo load is placed into the vehicle, thus indicating that the elevation angle 300 of the headlight 950 needs to be adjusted to compensate for placement of the cargo load. The height 320 of the housing 200 above the ground 910 may increase when the cargo load is removed from the vehicle, thus indicating that the elevation angle 300 of the headlight 950 needs to be adjusted to compensate for removal of the cargo load.

In some embodiments, the distance checker 230 may be a laser ranging device that directs a laser light at the ground 910 to determine the height 320. As a non-limiting example, the distance checker 230 may measure the time required for the laser light to be reflected off of the ground 910 and return to the distance checker 230 and may correlate the time with a distance.

The tilt mechanism may pivot the swivel bracket 220 responsive to an indication from the controller 262 that the height 320 of the housing 200 above the ground 910 has changed. The tilt mechanism may comprise the right motor 276, a right belt drive, the left motor 266, and a left belt drive.

The right motor 276 may convert electrical energy into mechanical energy. The right motor 276 may cause rotation of a right motor pulley 280 when electrical energy is applied to the right motor 276. The direction of the rotation may depend upon the polarity of the electrical potential that is applied by the controller 262. Rotation of the shaft of the right motor 276 in a first rotational direction 331 may cause the swivel bracket 220 to pivot in a first tilt direction 341. Rotation of the shaft of the right motor 276 in a second rotational direction 332 may cause the swivel bracket 220 to pivot in a second tilt direction 342.

In some embodiments, the right motor 276 may be a stepper motor.

The right belt drive may comprise the right motor pulley 280, a right swivel pulley 284, and a right belt 282. The right motor pulley 280 may be coupled to the shaft of the right motor 276 such that rotation of the right motor 276 causes rotation of the right motor pulley 280. The right swivel pulley 284 may be coupled to the right pivot 224 such that rotation of the right swivel pulley 284 causes rotation of the swivel bracket 220. The right motor pulley 280 may be aligned with the right swivel pulley 284 such that the right belt 282 may link the right motor pulley 280 to the right swivel pulley 284. Rotation of the right motor pulley 280 may result in rotation of the right swivel pulley 284 in the same direction. The left motor 266 may convert electrical energy into mechanical energy. The left motor 266 may cause rotation of a left motor pulley 270 when electrical energy is applied to the left motor 266. The direction of the rotation may be consistent with the direction of the pivoting caused by the right motor 276. In some embodiments, the left motor 266 may be a stepper motor.

The left belt drive may comprise the left motor pulley 270, a left swivel pulley 274, and a left belt 272. The left motor pulley 270 may be coupled to the shaft of the left motor 266 such that rotation of the left motor 266 causes rotation of the left motor pulley 270. The left swivel pulley 274 may be coupled to the left pivot 222 such that rotation of the left swivel pulley 274 causes rotation of the swivel bracket 220. The left motor pulley 270 may be aligned with the left swivel pulley 274 such that the left belt 272 may link the left motor pulley 270 to the left swivel pulley 274. Rotation of the left motor pulley 270 may result in rotation of the left swivel pulley 274 in the same direction.

The controller 262 may control the right motor 276 and the left motor 266 such that the controller 262 may change the elevation angle 300 of the headlight 950. The controller 262 may receive electrical status signals from the distance checker 230 and from the vehicle such that the controller 262 may be informed of the height 320 of the housing 200 above the ground 910, the gear that a transmission is in, the speed of the vehicle, or combinations thereof. The controller 262 may originate electrical control signals to the right motor 276 and to the left motor 266 such that the controller 262 may determine the timing and direction of rotation of the right motor 276 and the left motor 266.

Specifically, the controller 262 may read the height 320 from the distance checker 230 when the transmission is in PARK. The controller 262 may adjust the elevation angle 300 of the headlights 950 by energizing the right motor 276 and the left motor 266. In some embodiments, the controller 262 may lock the elevation angle 300 by refusing to energize the right motor 276 and the left motor 266 once the transmission is moved to any gear other than PARK. In some embodiments, the controller 262 may lock the elevation angle 300 by refusing to energize the right motor 276 and the left motor 266 if the vehicle is moving as determined by the speed of the vehicle. The controller 262 may be powered, either directly or indirectly, by a vehicle battery 902.

The headlight socket 240 may be an electrical coupling for powering the headlight 950. The headlight socket 240 may removably couple to a connector on the rear of the headlight 950.

In some embodiments, the invention 100 may comprise a switch 290. The switch 290 may be electrically coupled to the controller 262 such that the controller 262 is aware of the position of the switch 290. As non-limiting examples, the switch 290 may be accessible on the dashboard of the vehicle or placed elsewhere within the passenger compartment such that the switch 290 is accessible to the operator of the vehicle. The controller 262 may adjust the elevation angle 300 of the headlight 950 when the switch 290 is placed in a first switch position 351. The controller 262 may lock the elevation angle 300 of the headlight 950 when the switch 290 is placed in a second switch position 352.

In use, the invention 100 may be installed in the vehicle, usually in pairs. The remainder of the 'in use' description focuses on a single housing. When the transmission of the vehicle is placed into PARK, or when the switch 290 is placed into the first switch position 351, the controller 262 may determine the height 320 of the housing 200 by activating the distance checker 230. If the height 320 of the housing 200 has changed due to the cargo load being placed into or removed from the vehicle, the controller 262 may change the elevation angle 300 of the headlight 950. The controller 262 may rotate the right motor 276 in the first rotational direction 331 to tilt the headlight 950 in the first tilt direction 341. The controller 262 may rotate the right motor 276 in the second rotational direction 332 to tilt the headlight 950 in the second tilt direction 342. While the right motor 276 is energized, the left motor 266 may also be energized such that the right motor 276 and the left motor 266 cooperatively tilt the swivel bracket 220 in the same direction. Once the transmission is moved into a gear other than PARK, or the switch 290 is placed into the second switch position 352, the controller 262 may stop adjusting the elevation angle 300.

DEFINITIONS

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "couple", "couples", "coupled" or "coupling", refer to connecting, either directly or indirectly, and does not necessarily imply a mechanical connection.

As used herein, "elevation angle" refers to the angle between a line and the horizon.

As used herein, "energize" and/or "energization" refer to the application of an electrical potential to a system or subsystem.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "headlight" is a lamp that is mounted on a vehicle for the purpose of illuminating the primary direction, also informally referred to as the forward direction, of travel of the vehicle.

As used in this disclosure, a "housing" is a rigid casing that encloses and protects one or more devices.

As used in this disclosure, the word "lateral" refers to the sides of an object or movement towards a side. Lateral directions are generally perpendicular to longitudinal directions. "Laterally" refers to movement in a lateral direction.

As used in this disclosure, a "motor" refers to a device that transforms energy from an external power source into mechanical energy.

As used in this disclosure, "orientation" refers to the positioning and/or angular alignment of a first object relative to a second object or relative to a reference position or reference direction.

As used herein, "passenger compartment" refers to the area of a vehicle designed and intended for the seating of the driver and passengers.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, a "socket" is an opening or cavity that is configured to receive an inserted component.

As used in this disclosure, a "switch" is an electrical device that starts and stops the flow of electricity through an electric circuit by completing or interrupting an electric circuit. The act of completing or interrupting the electrical circuit may be called actuation. Completing or interrupting an electric circuit with a switch is often referred to as closing or opening a switch, respectively. Completing or interrupting an electric circuit is also referred to as making or breaking the circuit, respectively.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A angle-adjusting vehicular headlights comprising:
a housing, a swivel bracket, a distance checker, a tilt mechanism, a controller, and a headlight socket;
wherein the angle-adjusting vehicular headlights change an elevation angle of a headlight responsive to a determination by the controller that an inclination angle of a vehicle has changed.

2. The angle-adjusting vehicular headlights according to claim 1
wherein the housing is an outermost enclosure for the headlight;
wherein the housing couples to the vehicle;
wherein the orientation of the housing remains fixed relative to the vehicle as a cargo load within the vehicle changes.

3. The angle-adjusting vehicular headlights according to claim 2
wherein the housing comprises a right motor mount and a left motor mount;
wherein the right motor mount and the left motor mount are projections within the housing located on alternate lateral sides of the housing;
wherein a right motor couples to the right motor mount and a left motor couples to the left motor mount.

4. The angle-adjusting vehicular headlights according to claim 3
wherein the swivel bracket is a pivoting bracket located within the housing;
wherein the swivel bracket is pivotably coupled to the housing via a right pivot and a left pivot;
wherein the headlight removably couples to the front of the swivel bracket such that the elevation angle of the headlight is determined by the swivel bracket;
wherein the swivel bracket pivots to change the elevation angle of the headlight relative to the housing.

5. The angle-adjusting vehicular headlights according to claim 4
wherein the distance checker determines a height of the housing above ground;
wherein the distance checker is coupled to the housing and is accessible on the underside of the housing where the distance checker has an unobstructed line-of-sight to the ground;
wherein the distance checker communicates the height of the housing above the ground to the controller;
wherein the height of the housing above the ground decreases when the cargo load is placed into the vehicle, thus indicating that the elevation angle of the headlight needs to be adjusted to compensate for placement of the cargo load;
wherein the height of the housing above the ground increases when the cargo load is removed from the vehicle, thus indicating that the elevation angle of the headlight needs to be adjusted to compensate for removal of the cargo load.

6. The angle-adjusting vehicular headlights according to claim 5
wherein the distance checker is a laser ranging device that directs a laser light at the ground to determine the height.

7. The angle-adjusting vehicular headlights according to claim 6
wherein the distance checker measures the time required for the laser light to be reflected off of the ground and return to the distance checker and correlates the time with a distance.

8. The angle-adjusting vehicular headlights according to claim 5
wherein the tilt mechanism pivots the swivel bracket responsive to an indication from the controller that the height of the housing above the ground has changed;
wherein the tilt mechanism comprises the right motor, a right belt drive, the left motor, and a left belt drive.

9. The angle-adjusting vehicular headlights according to claim 8
wherein the right motor converts electrical energy into mechanical energy;
wherein the right motor causes rotation of a right motor pulley when electrical energy is applied to the right motor;
wherein the direction of the rotation of the right motor pulley depends upon the polarity of the electrical potential that is applied by the controller.

10. The angle-adjusting vehicular headlights according to claim 9
wherein rotation of the shaft of the right motor in a first rotational direction causes the swivel bracket to pivot in a first tilt direction;
wherein rotation of the shaft of the right motor in a second rotational direction causes the swivel bracket to pivot in a second tilt direction.

11. The angle-adjusting vehicular headlights according to claim 10
wherein the right motor is a stepper motor.

12. The angle-adjusting vehicular headlights according to claim 10
wherein the right belt drive comprises the right motor pulley, a right swivel pulley, and a right belt;
wherein the right motor pulley is coupled to the shaft of the right motor such that rotation of the right motor causes rotation of the right motor pulley;
wherein the right swivel pulley is coupled to the right pivot such that rotation of the right swivel pulley causes rotation of the swivel bracket;
wherein the right motor pulley is aligned with the right swivel pulley such that the right belt links the right motor pulley to the right swivel pulley;
wherein rotation of the right motor pulley results in rotation of the right swivel pulley in the same direction;
wherein the left motor converts electrical energy into mechanical energy;
wherein the left motor causes rotation of a left motor pulley when electrical energy is applied to the left motor;
wherein the direction of the rotation of the left motor pulley is consistent with the direction of rotation of the right motor.

13. The angle-adjusting vehicular headlights according to claim 12
wherein the left motor is a stepper motor.

14. The angle-adjusting vehicular headlights according to claim 12
wherein the left belt drive comprises the left motor pulley, a left swivel pulley, and a left belt;
wherein the left motor pulley is coupled to the shaft of the left motor such that rotation of the left motor causes rotation of the left motor pulley;
wherein the left swivel pulley is coupled to the left pivot such that rotation of the left swivel pulley causes rotation of the swivel bracket;
wherein the left motor pulley is aligned with the left swivel pulley such that the left belt links the left motor pulley to the left swivel pulley;
wherein rotation of the left motor pulley results in rotation of the left swivel pulley in the same direction.

15. The angle-adjusting vehicular headlights according to claim 14
wherein the controller controls the right motor and the left motor such that the controller changes the elevation angle of the headlight;
wherein the controller receives electrical status signals from the distance checker and from the vehicle such that the controller is informed of the height of the housing above the ground, the gear that a transmission is in, the speed of the vehicle, or combinations thereof;
wherein the controller originates electrical control signals to the right motor and to the left motor such that the controller determines the timing and direction of rotation of the right motor and the left motor.

16. The angle-adjusting vehicular headlights according to claim 15
wherein the controller reads the height from the distance checker when the transmission is in PARK;
wherein the controller adjusts the elevation angle of the headlights by energizing the right motor and the left motor.

17. The angle-adjusting vehicular headlights according to claim 16
wherein the controller locks the elevation angle by refusing to energize the right motor and the left motor once the transmission is moved to any gear other than PARK.

18. The angle-adjusting vehicular headlights according to claim 16
wherein the controller locks the elevation angle by refusing to energize the right motor and the left motor if the vehicle is moving as determined by the speed of the vehicle.

19. The angle-adjusting vehicular headlights according to claim 15
wherein the headlight socket is an electrical coupling for powering the headlight;
wherein the headlight socket removably couples to a connector on the rear of the headlight.

20. The angle-adjusting vehicular headlights according to claim 15
wherein the angle-adjusting vehicular headlights comprises a switch;
wherein the switch is electrically coupled to the controller such that the controller is aware of the position of the switch;
wherein the controller adjusts the elevation angle of the headlight when the switch is placed in a first switch position;
wherein the controller locks the elevation angle of the headlight when the switch is placed in a second switch position.

* * * * *